United States Patent
Nate et al.

(10) Patent No.: US 7,898,217 B2
(45) Date of Patent: Mar. 1, 2011

(54) CHARGE CONTROL CIRCUIT

(75) Inventors: Satoru Nate, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 910 days.

(21) Appl. No.: 11/801,323

(22) Filed: May 9, 2007

(65) Prior Publication Data

US 2007/0290655 A1    Dec. 20, 2007

(30) Foreign Application Priority Data

May 9, 2006    (JP) .................. 2006-130022

(51) Int. Cl.
*H02J 7/00*    (2006.01)
(52) U.S. Cl. ......... 320/134; 320/135; 320/136; 320/162; 320/163
(58) Field of Classification Search .......... 320/134–136, 320/162, 163
See application file for complete search history.

(56) References Cited

U.S. PATENT DOCUMENTS

| | | | | |
|---|---|---|---|---|
| 5,254,951 A | * | 10/1993 | Goto et al. | 324/426 |
| 6,194,875 B1 | * | 2/2001 | Takimoto et al. | 320/164 |
| 6,215,279 B1 | * | 4/2001 | Rakovski et al. | 320/135 |
| 6,218,811 B1 | * | 4/2001 | Tokuyama | 320/137 |
| 6,373,225 B1 | * | 4/2002 | Haraguchi et al. | 320/122 |
| 7,012,405 B2 | * | 3/2006 | Nishida et al. | 320/137 |

FOREIGN PATENT DOCUMENTS

| | | |
|---|---|---|
| JP | 9-219935 | 8/1997 |
| JP | 11-69635 A | 3/1999 |
| JP | 2001-14040 A | 1/2001 |
| JP | 2003-180038 A | 6/2003 |
| JP | 2004-080927 A | 3/2004 |
| JP | 2006-101566 A | 4/2006 |

OTHER PUBLICATIONS

Japanese Office Action for Patent Application No. 2006-130022 dispatched Apr. 20, 2010 with English translation.

* cited by examiner

*Primary Examiner* — Edward Tso
*Assistant Examiner* — Samuel Berhanu
(74) *Attorney, Agent, or Firm* — Cantor Colburn LLP

(57) ABSTRACT

In a charge control circuit that adjusts a charging current flowing through a battery to be charged from a power supply, a sense resistor is provided on a charging path to the battery from an external power supply. A charging current adjustment circuit adjusts the charging current based on an error voltage between a voltage drop across the sense resistor and a predetermined reference voltage. The charging control circuit is integrated in a package. The charging current is inputted to a current input terminal. A battery terminal outputs the charging current to the battery. The current input terminal and the battery terminal also function as terminals used to measure a resistance value of the sense resistor. A voltage monitoring terminal is provided to measure the reference voltage in an inspection process.

6 Claims, 6 Drawing Sheets

CHARGE CONTROL CIRCUIT

BACKGROUND OF THE INVENTION

1. Field of the Invention

The present invention relates to a charging circuit for charging a battery and it particularly relates to a technique for setting a charging current.

2. Description of the Related Art

Many electronic circuits, which perform digital signal processing, such as a CPU (Central Processing Unit), a DSP (Digital Signal Processor), an LCD panel, and other analog/digital circuits are mounted on various types of electronic devices in recent years such as a mobile phone, a PDA (Personal Digital Assistant) and a notebook type personal computer. In battery-operated electronic devices where batteries are mounted as power supplies, each electronic circuit in the devices is operated by a battery voltage from the battery.

If the battery is a rechargeable battery such as a lithium-ion battery, the electronic device will have a built-in charging circuit therein. This charging circuit receives externally a voltage supply from an AC adaptor, for example, which supplies a charging current to the battery. The related technology is disclosed in Reference (1) in the following Related Art List, for instance.

[Related Art List]
(1) Japanese Patent Application Laid-Open No. Hei09-219935.

In such a charging circuit, it is a common practice that a charging current flowing from an external power supply to a battery is monitored and the battery is so charged as to maintain this current at a predetermined value. As a method for monitoring the charging current, a method is generally used where a resistive element for detecting the current is provided on a charging path and then a voltage drop across this resistive element is monitored. When the charging current is of the order of several hundreds mA to several A and is therefore large, the resistance value is preferably designed to be several mΩ to several tens of mΩ for the purpose of reducing the power loss in this resistive element. Such a low-resistance element is provided outside a charge control circuit that controls the state of charge or is provided within an LSI circuit.

If the resistance value of the resistive element varies, a problem will arise where it is not possible to accurately estimate the charging current. If the resistive element is provided outside the charge control circuit by use of chip components and the like, this variation problem can be eliminated by replacing the resistive element in an inspection process or manufacturing process of a product. On the other hand, if the resistive element is provided within an LSI circuit, problems will arise where a variation amounting to a several tens of percentage occurs due to a process variation and, besides, it is difficult for a low-resistance element to adjust the resistance value by a trimming process or the like. As a result, when the resistive element is provided within an LSI circuit, suppressing the variation in charging current caused by a variation in resistive element becomes an issue to be considered.

SUMMARY OF THE INVENTION

The present invention has been made in view of the foregoing problems, and a general purpose thereof is to provide a technique by which to accurately set a charging current in a charge control circuit where a current detecting resistive element is provided in an LSI circuit.

One embodiment of the present invention relates to a charge control circuit for adjusting a charging current flowing through a battery to be charged from a power supply. This circuit comprises: a sense resistor provided on a charging path leading to the battery from the power supply; a charging current adjustment circuit which adjusts the charging current based on an error voltage between a voltage drop across the sense resistor and a predetermined reference voltage wherein the sense resistor and the charging current adjusting circuit are integrated; a current input terminal which receives an input of the charging current; an battery terminal which outputs the charging current to the battery; a terminal used to measure a resistance value of the sense resistor in an inspection process; and a terminal used to measure the reference voltage in the inspection process.

According to this embodiment, the resistance value of the sense resistor and the reference voltage can be measured in an inspection process. The value of the reference voltage can be set according to this measurement. Thus, the charging current can be set with accuracy even if the resistance value of the sense resistor varies.

In a preferred embodiment, the charging current adjustment circuit may include: a voltage conversion circuit which converts a voltage drop across the sense resistor into a voltage potential to ground voltage; a variable voltage source which generates the predetermined reference voltage; an error amplifier which generates an error voltage between the reference voltage and the voltage drop; and a current adjusting unit which adjusts an on-state of a charging transistor provided on the charging path, according to the error voltage outputted from the error amplifier. The variable voltage source may include an adjusting means which adjusts the reference voltage by a trimming process. In this case, the reference voltage can be set by use of the variable voltage source.

In a preferred embodiment, the charge control circuit further comprise a switch pass circuit which includes a plurality of input terminals and a single output terminal and which selectively connects any one of the input terminals to the output terminal. The output terminal of the switch pass circuit is configured such that the output terminal thereof is capable of monitoring voltage from outside and voltage is applicable thereto; and a terminal, among terminals in the charge control circuit, at which a voltage to be measured in an inspection process appears and which does not need to be connected with outside at the time of an actual charging operation may be connected with one of the plurality of input terminals. The terminals at which voltage to be measured in an inspection process appears may includes a terminal of the sense resistor and a terminal at which the reference voltage appears.

Also, a terminal, among terminals in the charge control circuit, to which voltage is to be applied from outside in an inspection process and which does not need to be connected with outside at the time of an actual charging operation may be connected with one of the plurality of input terminals. The terminals to which voltage is to be applied in an inspection process may include a terminal of the sense resistor and a terminal at which the reference voltage appears.

The number of electrode pads can be reduced by the provision of the switch pass circuit.

In a preferred embodiment, the charge control circuit may further comprise: an auxiliary terminal configured such that a voltage is capable of being applied thereto from outside in an inspection process; and a subsidiary resistor provided between the auxiliary terminal and one end of the sense resistor. The charging current adjustment circuit may adjust the charging current based on voltage across the subsidiary resistor and the predetermined reference voltage.

In such a case, the circuit operation can be tested in the inspection process without the need to deliver a large current to the sense resistor.

The charge control circuit may further comprise a bypass switch, provided in parallel with the subsidiary resistor, which turns off during an inspection process and turns on during a charging operation. In this case, during a charging operation the voltage across the sense resistor and the subsidiary resistor, namely the sum of voltage drops across the two resistors can be brought close to the voltage drop across the sense resistor. Thus the charging current can be controlled with a higher degree of accuracy.

Another embodiment of the present invention relates to a charging circuit for charging a battery based on supply voltage from a power supply. This charging circuit comprises: a charging transistor provided on a path leading to the battery from the power supply; and a charge control circuit, according to any one of the above-described embodiments, which adjusts a charging current supplied to the battery by adjusting an on-state of the charging transistor.

Still another embodiment of the present invention relates to an electronic apparatus. This electronic apparatus comprises: a battery; the above-described charging circuit which charges the battery based on the supply voltage from the power supply; and a load circuit driven by the battery.

Still another embodiment of the present invention relates to a method for correcting a charging current of a charge control circuit having a structure including a sense resistor provided on a charging path leading to a battery from a power supply and a charging current adjustment circuit which adjusts the charging current based on an error voltage between a voltage drop across the sense resistor and a predetermined reference voltage. This method includes: measuring a resistance value of the sense resistor; measuring the reference voltage; calculating the charging current by dividing the measured reference voltage by the measured resistance value of the sense resistor; calculating a difference current between the calculated charging current and a target value of the charging current; calculating an amount of adjustment for the reference voltage by dividing the calculated difference current by the resistance value of the sense resistor; and adding or subtracting the calculated amount of adjustment for the reference voltage to or from the reference voltage.

According to this embodiment, the charging current can be brought close to a predetermined designed value with high accuracy even if the sense resistor varies.

It is to be noted that any arbitrary combination or rearrangement of the above-described structural components and so forth are effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
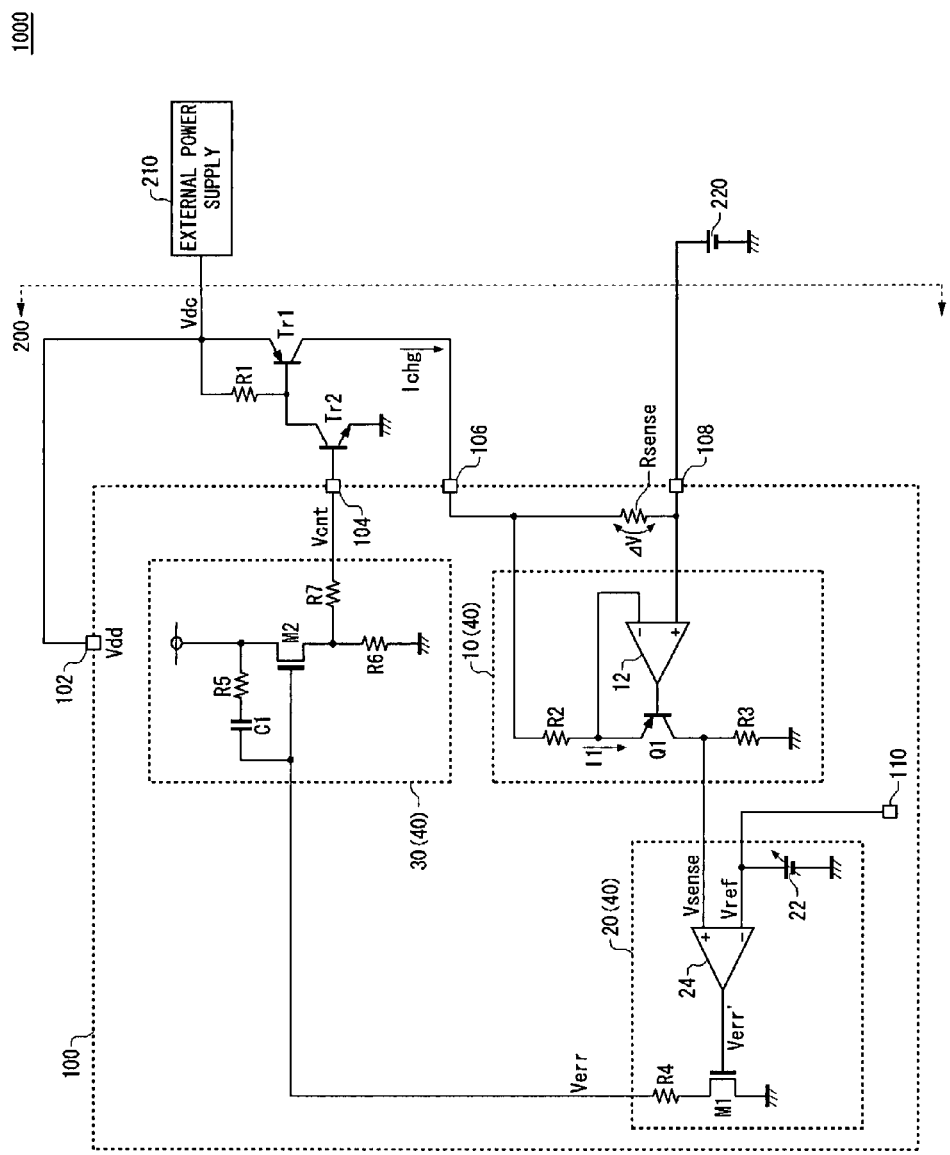
FIG. 1 is a circuit diagram showing an overall structure of an electronic apparatus equipped with a charging circuit according to a first embodiment of the present invention.

The invention will now be described based on preferred embodiments which do not intend to limit the scope of the present invention but exemplify the invention. All of the features and the combinations thereof described in the embodiments are not necessarily essential to the invention.

Hereinbelow, a charge control circuit according to embodiments of the present invention will be described with reference to Figures. In each of the Figures, the same or equivalent components, members and processings are given the identical reference numerals or symbols and the repeated explanation thereof will be omitted as appropriate. Also, in the following description, symbols assigned to a voltage signal and a current signal or resistance and capacitance will be used to represent a voltage value and a current value or a resistance value and a capacitance value, respectively, as need arises.

First Embodiment

FIG. 1 is a circuit diagram showing an overall structure of an electronic apparatus 1000 equipped with a charging circuit 200 according to a first embodiment of the present invention. The electronic apparatus 1000 is battery-operated information terminal equipment such as a mobile phone terminal, a PDA and a notebook type PC. The electronic apparatus 1000 is comprised of a charging circuit 200 and a battery 220. In addition to these, the electronic apparatus 1000 is comprised of a power supply circuit, a DSP, a liquid crystal panel and other analog and digital components all of which are not shown here.

The battery 220 is a rechargeable battery such as a lithium-ion battery and a NiCd (nickel-cadmium) battery, and its battery voltage Vbat is supplied to the electronic apparatus 1000 and other circuit blocks.

An external power supply 210, which is connected to the electronic apparatus 1000, is an AC adaptor that converts a commercial AC voltage into a DC voltage and a DC/DC converter that decreases the voltage of an in-vehicle battery or the like, for example. The external power supply 210 supplies a DC supply voltage Vdc to the charging circuit 200.

The charging circuit 200 charges the battery 220 based on the supply voltage Vdc from the external power supply 210. The charging circuit 200 includes a charging transistor Tr1, a charge control circuit 100 and other circuit elements.

The charging transistor Tr1 is provided on a charging path leading from the external power supply 210 to the battery 220. In the first embodiment, a path leading to the battery 220 via the charging transistor Tr1, a current input terminal 106 of the charge control circuit 100, a sense resistor Rsense described later and a battery terminal 108 is the charging path. An emitter of the charging transistor Tr1, which is a PNP bipolar transistor, is connected with the external power supply 210. A first resistor R1 is connected between the emitter and the base of the charging transistor Tr1. A charge control transistor Tr2 is connected between the base of the charging transistor Tr1 and a ground terminal which is a fixed voltage terminal. A collector of the charge control transistor Tr2, which is an NPN bipolar transistor, is connected with the base of the charging transistor Tr1, whereas an emitter of the charge control transistor Tr2 is connected to the ground terminal. A collector of the charging transistor Tr1 is connected to the charge control circuit 100.

The charge control circuit 100 is integrated on a semiconductor substrate as a function IC, and adjusts a charging current Ichg supplied to the battery 220 by adjusting an ON state of the charging transistor Tr1. As input/output terminals, the charge control circuit 100 includes a power supply terminal 102, a charge control terminal 104, a current input terminal 106 and a battery terminal 108. In an inspection process of the charge control circuit 100, the current input terminal 106 and the battery terminal 108 function as terminals for measuring a resistance value of the sense resistor Rsense.

The battery 220 is connected to the battery terminal 108 whereas the collector of the charging transistor Tr1 is connected to the current input terminal 106. A control voltage Vcnt for controlling the degree of an on-state of the charging transistor Tr1 is outputted from the charge control terminal 104. This control voltage Vcnt is inputted to a base of the charge control transistor Tr2. A supply voltage Vdd is supplied from the external power supply 210 to the power supply terminal 102 which serves as the power supply terminal for the charge control circuit 100 itself. Circuit elements in the charge control circuit 100 operates based on the supply voltage Vdd.

A description will be given hereunder of an internal structure of the charge control circuit 100. The charge control circuit 100 is comprised of a sense resistor Rsense, a voltage conversion circuit 10, an error voltage generator 20, and a current adjustment unit 30. The sense resistor Rsense is provided for the purpose of monitoring the charging current Ichg flowing through the battery 220. The sense resistor Rsense is provided between the current input terminal 106 and the battery terminal 108, that is, it is provided on a charging path leading from the external power supply 210 to the battery 220. A voltage drop $\Delta V$ proportional to the resistance value Rsense of the sense resistor and the charging current Ichg occurs across the sense resistor Rsense.

A charging current adjustment circuit 40, which includes the voltage conversion circuit 10, the error voltage generator 20 and the current adjustment unit 30, adjusts a charging current based on an error voltage Verr between the voltage drop $\Delta V$ across the sense resistor Rsense and a predetermined reference voltage Vref. That is, the charging current adjustment circuit 40 regards the voltage drop $\Delta V$ across the sense resistor Rsense as the charging current Ichg and then adjusts the degree of the on-state of the charging transistor Tr1. More specifically, the charge control circuit 100 adjusts the degree of the on-state of the charging transistor by feedback so that the voltage drop in the sense resistor Rsense is brought close to a predetermined voltage level.

The voltage conversion circuit 10 converts the voltage drop $\Delta V$ across the sense resistor Rsense into a sense voltage Vsense to the ground voltage. The voltage conversion circuit 10 includes a second resistor R2, a third resistor R3, a first bipolar transistor Q1 and a first operational amplifier 12.

A low-voltage-side terminal of the sense resistor Rsense is connected to a noninverting input terminal of the first operational amplifier 12. The second resistor R2 is provided between a high-voltage-side terminal of the sense resistor Rsense and an inverting input terminal of the first operational amplifier 12. The first bipolar transistor Q1 is a PNP bipolar transistor, and an emitter thereof is connected to the second resistor R2 and the inverting input terminal of the first operational amplifier 12 whereas a base thereof is connected to an output terminal of the first operational amplifier 12. The third resistor R3 is provided between the ground terminal and a collector of the first bipolar transistor Q1.

Suppose that in the voltage conversion circuit 10 an imaginary short holds in the first operational amplifier 12. Then the voltage at the noninverting input of the first operational amplifier 12 and that at the inverting input of the first operational amplifier 12 can be considered equal to each other. Then the voltage drop $\Delta V$ across the sense resistor Rsense is applied to the second resistor R2, so that a first current $I1=\Delta V/R2$ is generated. The first current I1 flows through the first bipolar transistor Q1 and the third resistor R3. And the sense voltage Vsense given by $I1\times R3$ to the ground voltage is generated. Here, $Vsense=\Delta V\times R3/R2$ holds, so that the sense voltage Vsense is a voltage proportional to the voltage drop $\Delta V$ across the sense resistor Rsense. It is preferred that the second resistor R2 and the third resistor R3 are configured in pair.

The error voltage generator 20 receives the sense voltage Vsense generated by the voltage conversion circuit 10, compares this Vsense with a predetermined reference voltage Vref and generates an error voltage Verr obtained by amplifying the error between the two voltages Vsense and Vref. The error voltage generator 20 includes a variable voltage source 22, a second operational amplifier 24, a first MOS transistor M1 and a fourth resistor R4.

The variable voltage source 22 generates the predetermined reference voltage Vref. The variable voltage source 22 is so configured as to be able to adjust the value of the reference voltage Vref by a trimming process. The reference voltage Vref generated by the variable voltage source 22 is inputted to an inverting input terminal of the second operational amplifier 24. In the first embodiment, the reference voltage Vref, which is an output of the variable voltage source 22, can be monitored from outside at least in an inspection process of the charge control circuit 100. In the charge control circuit 100 shown in FIG. 1, a voltage monitoring terminal 110 is provided in the output of the variable voltage source 22. The voltage monitoring terminal 110 serves its purpose as long as the voltage can be measured from outside and therefore it need not be formed as an electrode pad.

The sense voltage Vsense outputted from the voltage conversion circuit 10 is inputted to a noninverting input terminal of the second operational amplifier 24. The second operational amplifier 24 amplifies the error between the sense voltage Vsense and the reference voltage Vref so as to output an error voltage Verr'. The first MOS transistor M1 is an N-channel MOSFET, and a source thereof is grounded and an output terminal of the second operational amplifier 24 is connected to a gate thereof. One end of the fourth resistor R4 is connected to a drain of the first MOS transistor M1, whereas a voltage appearing at the other end of the fourth resistor R4 is outputted as the error voltage Verr.

The current adjustment unit 30 receives the error voltage Verr outputted from the error voltage generator 20 and then generates a control voltage Vcnt according to this error voltage Verr so as to adjust the base voltage of the charge control transistor Tr2 via the charge control terminal 104. As the degree of the on-state of the charge control transistor Tr2 is controlled by the control voltage Vcnt, the collector current of the charge control transistor Tr2 varies and thereby the voltage drop across the second resistor R2 varies. As a result thereof, a base-emitter voltage of the charging transistor Tr1 varies so as to adjust the degree of the on-state of the charging transistor Tr1.

The current adjustment unit 30 includes a second MOS transistor M2, a fifth resistor R5, a sixth resistor R6, a seventh resistor R7, and a first capacitor C1. The error voltage Verr from the error voltage generator 20 is inputted to a gate of the second MOS transistor M2 which is an N-channel MOSFET. For the purpose of stabilizing the circuitry, the first capacitor C1 and the fifth resistor R5 are provided in series between a gate and a drain of the second MOS transistor M2. The sixth resistor R6 is provided between a source of the second MOS transistor M2 and ground. One end of the seventh resistor R7 is connected to the source of the second MOS transistor M2 whereas the other end thereof is connected to the charge control terminal 104.

Circuit elements, such as a switch to shut off the charging current, which are not shown in FIG. 1 may be provided on a charging path leading from the current input terminal 106 to the battery terminal 108 in the charge control circuit 100.

An operation of the charging circuit 200 structured as above will now be described. The charge control circuit 100 is started up with a supply of the external supply voltage Vdd from the external power supply 210. The charge control circuit 100 has a battery voltage detector built therein. This battery voltage detector (not shown) monitors the voltage at the battery terminal 108. When the battery voltage detector detects that the battery voltage Vbat is low, it starts a charging operation.

As the charging operation starts, a charging current Ichg flows through a charging path leading to the battery 220 via the charging transistor Tr1, the current input terminal 106, the sense resistor Rsense and the battery terminal 108. At this time, a voltage drop of ΔV=Rsense×Ichg occurs across the sense resistor Rsense. The voltage drop ΔV is converted to the sense voltage Vsense, by the voltage conversion circuit 10, with the ground voltage as a reference.

The error voltage generator 20, which includes the second operational amplifier 24, outputs the error voltage Verr by feedback so that the sense voltage Vsense agrees with the variable voltage source 22. The current adjustment unit 30 adjusts the base voltage of the charge control transistor Tr2 according to this error voltage Verr.

As described above, since ΔV=Ichg×Rsense and Vsense=ΔV×R3/R2 hold, Vsense=Ichg×Rsense×R3/R2 holds. Now, suppose that the degree of the on-state of the charging transistor Tr1 is so controlled by feedback that Vref=Vsense holds. Then the charging current Ichg will be stabilized at the current value given by Vref/Rsense×R2/R3.

In this manner, the charge control circuit 100 and the charging circuit 200 according to the first embodiment control the charging current in a manner that the charging current Ichg is converted to the voltage Vsense by the sense resistor built in the charge control circuit 100 and then the voltage Vsense is kept at a certain level by feedback. As a result, if the resistance value of the sense resistor Rsense varies, the charging current Ichg will be stabilized at a value different from a desired current value, thus affecting the charging operation.

In an inspection process, the charge control circuit 100 according to the first embodiment reduces the variation in charging current Ichg by carrying out an adjustment as follows.

Figure 2:
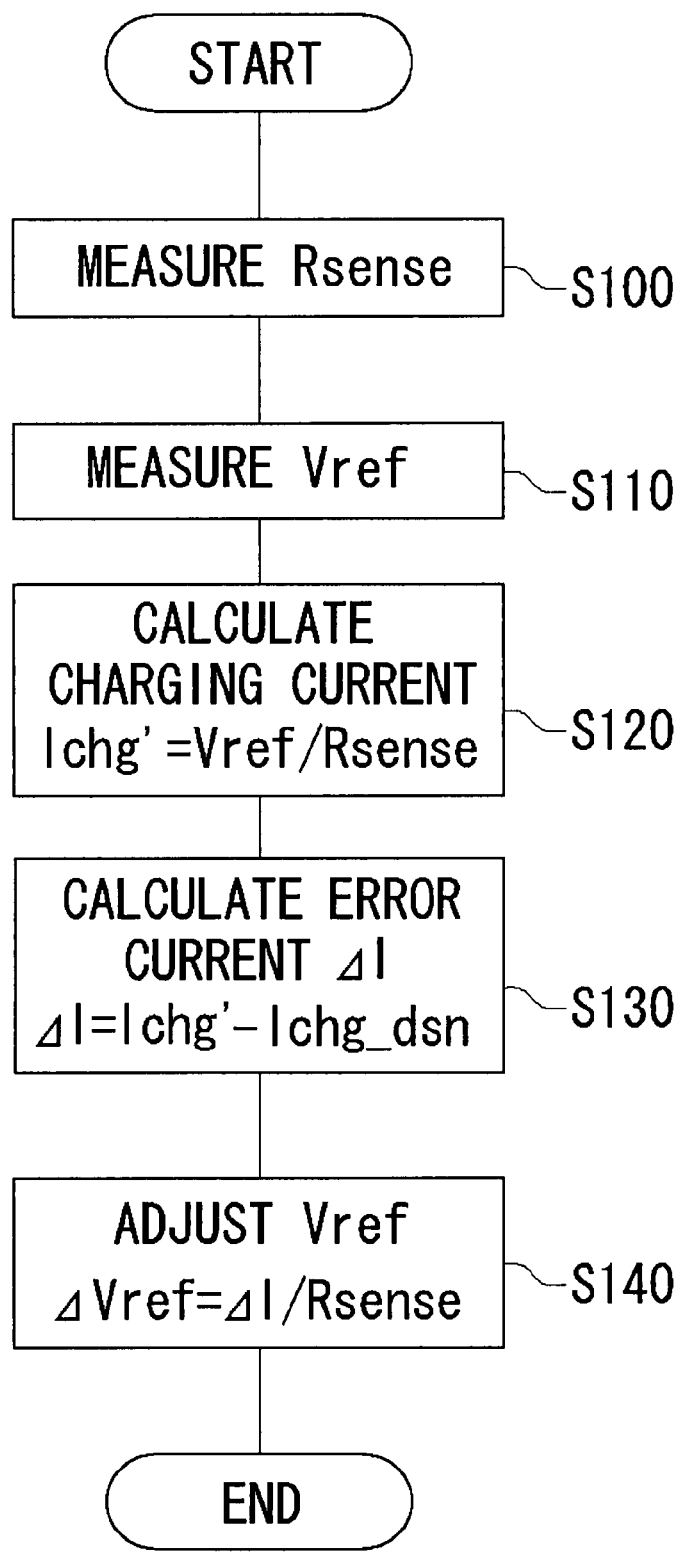
FIG. 2 is a flowchart showing a method for adjusting a charging current, according to a first embodiment of the present invention.

FIG. 2 is a flowchart showing a method for adjusting the charging current, according to the first embodiment.

First, the resistance value of the sense resistor Rsense is measured (S100). The reference voltage Vref generated by the variable voltage source 22 is also measured (S110). The order in which Step S100 and Step S110 are carried out may be reversed. Then, using the measured resistance value Rsense and the reference voltage Vref, the charging current Ichg' is calculated by use of a relation Ichg'=Vref/Rsense (S120).

Then the calculated target value Ichg' of the charging current is compared with a designed value Ichg_dsn of the charging current Ichg, and an error current ΔI therebetween is obtained from a relation ΔI=Ichg'−Ichg_dsn (S130). For example, if the calculated charging current Ichg' is 0.7 A and the designed value Ichg_dsn is 1 A, the error current ΔI current will be −0.3 A.

Then based on the thus obtained error current ΔI, the reference voltage Vref generated by the variable voltage source 22 is adjusted (S140). More specifically, the reference voltage Vref generated by the variable voltage source 22 is shifted in such a direction that the charging current Ichg' is brought closer to the designed value Ichg_dsn. Here, an amount of adjustment ΔVref for the reference voltage Vref can be obtained from ΔVref=ΔI/Rsense where Rsense is the resistance value of the sense resistor Rsense which is obtained from the measurement.

Figure 3:
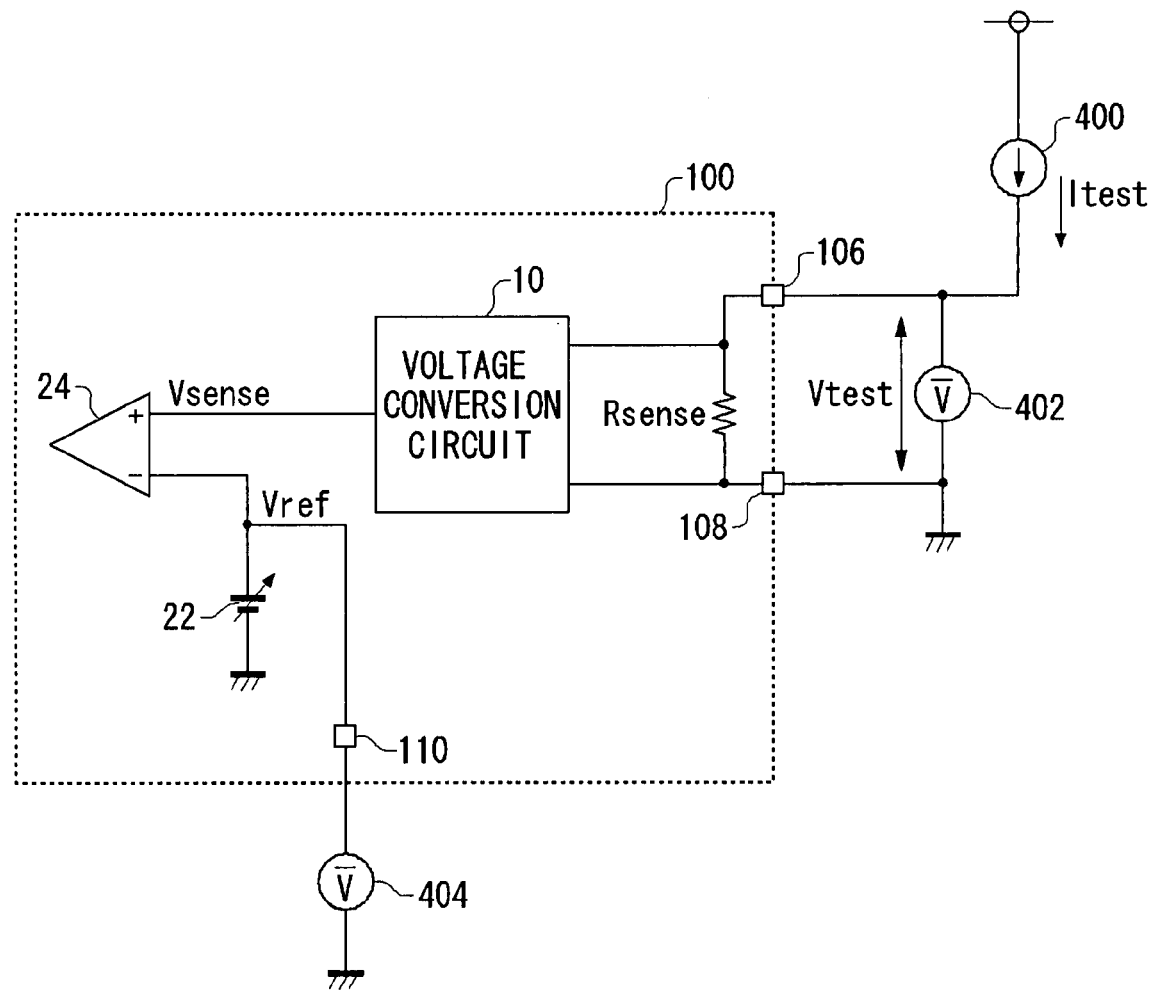
FIG. 3 illustrates a circuit configuration used in an inspection process of a charge control circuit shown in FIG. 1.

For example, it is possible to realize such adjustment by a circuitry described hereunder. FIG. 3 illustrates a circuit configuration used in an inspection process of the charge control circuit 100 shown in FIG. 1. Note that the charge control circuit 100 of FIG. 3 is illustrated in a simplified manner.

In the inspection process, a current source 400 is connected to a current input terminal of a charge control circuit 100, and a voltmeter 402 is connected between the current input terminal 106 and a battery terminal 108.

A predetermined test current Itest is delivered from the current source 400. Then a voltage drop given by Rsense× Itest occurs across the sense resistor Rsense. The voltage drop across the sense resistor Rsense is measured by the voltmeter 402. Using a voltage measured by the voltmeter 402 (hereinafter referred to "measured voltage Vtest"), the resistance value of the sense resistor Rsense can be obtained from Rsense=Vtest/Itest. It is to be noted that the resistance value of the sense resistor Rsense may be directly measured by use of a high-accuracy resistance measuring meter.

In the inspection process, the reference voltage Vref generated by a variable voltage source 22 is measured by a voltmeter 404 via a voltage monitoring terminal 110. Using the reference voltage Vref obtained from the measurement and the resistance value of the sense resistor Rsense obtained from the above-described relation, the current value Ichg' at which the charging current Ichg is stabilized is calculated from Ichg'=Vref/Rsense.

Then the calculated target value Ichg' of the charging current is compared with the designed value Ichg_dsn of the charging current Ichg, and the error current ΔI therebetween is obtained. Using the thus calculated error current ΔI and resistance value of the sense resistor Rsense, the amount of adjustment ΔVref for the reference voltage Vref is determined from the relation ΔVref=ΔI/Rsense.

Figure 4:
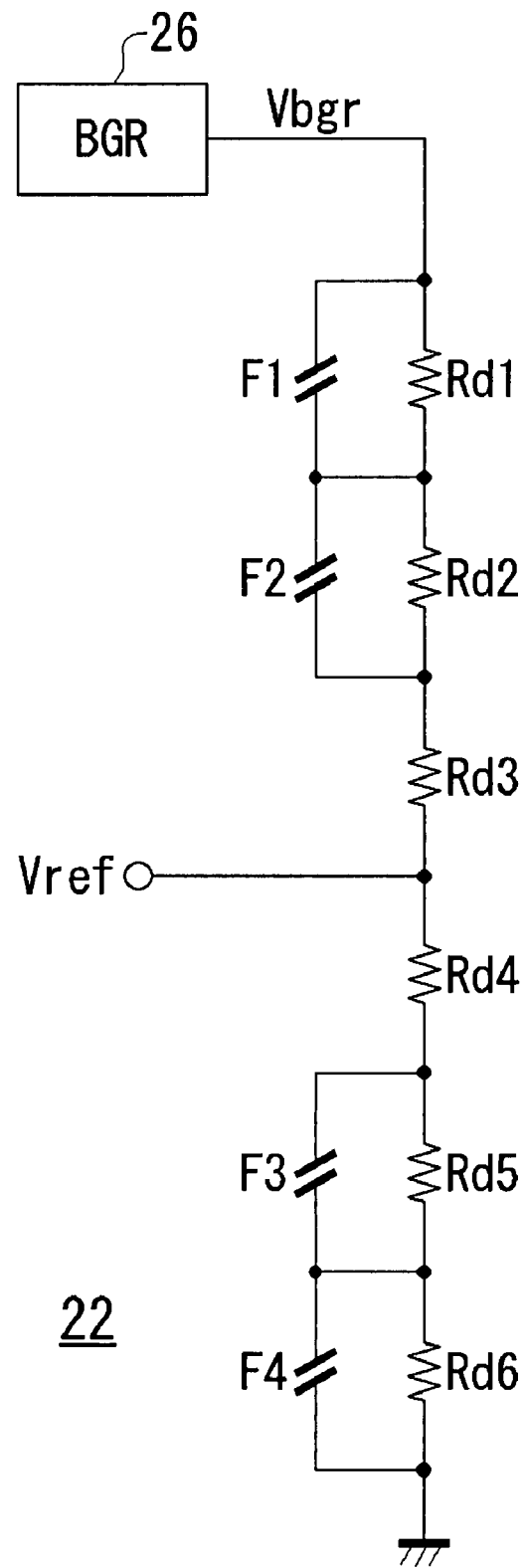
FIG. 4 is a circuit diagram showing an exemplary structure of a variable voltage source.

For instance, the variable voltage source 22 may be configured as shown in FIG. 4. FIG. 4 is a circuit diagram showing an exemplary structure of the variable voltage source 22. The variable voltage source 22 includes a plurality of resistors Rd1 to Rd6, a reference voltage source 26 such as a bandgap regulator circuit, and fuses F1 to F5.

The plurality of resistors Rd1 to Rd6 constitute a group of resistors connected in series. One end of the group of resistors is grounded, whereas a reference voltage Vbgr generated by the reference voltage source 26 is inputted to the other end of the group of resistors. The fuses F1 to F4 are elements that can be cut off by the application of overvoltage or overcurrent or the laser irradiation, and the fuses F1 to F4 are provided in parallel with the resistors Rd1, Rd2, Rd5 and Rd6, respectively. With this variable voltage source 22, the division ratio can be changed by cutting off this fuse as appropriate by the trimming process, so that the reference voltage Vref can be adjusted.

According to the charge control circuit 100 of the first embodiment, there are provided the terminals for monitoring the voltage across the sense resistor Rsense, so that the variation in the resistance value of the sense resistor Rsense can be measured in the inspection process. Further, the reference voltage Vref is adjusted according to the measured sense resistor Rsense. Thus, the fluctuation of the charging current Ichg can be suppressed and the charging current Ichg can be brought close to the designed value without adjusting directly the resistance value of the sense resistor Rsense.

Second Embodiment

Figure 5:
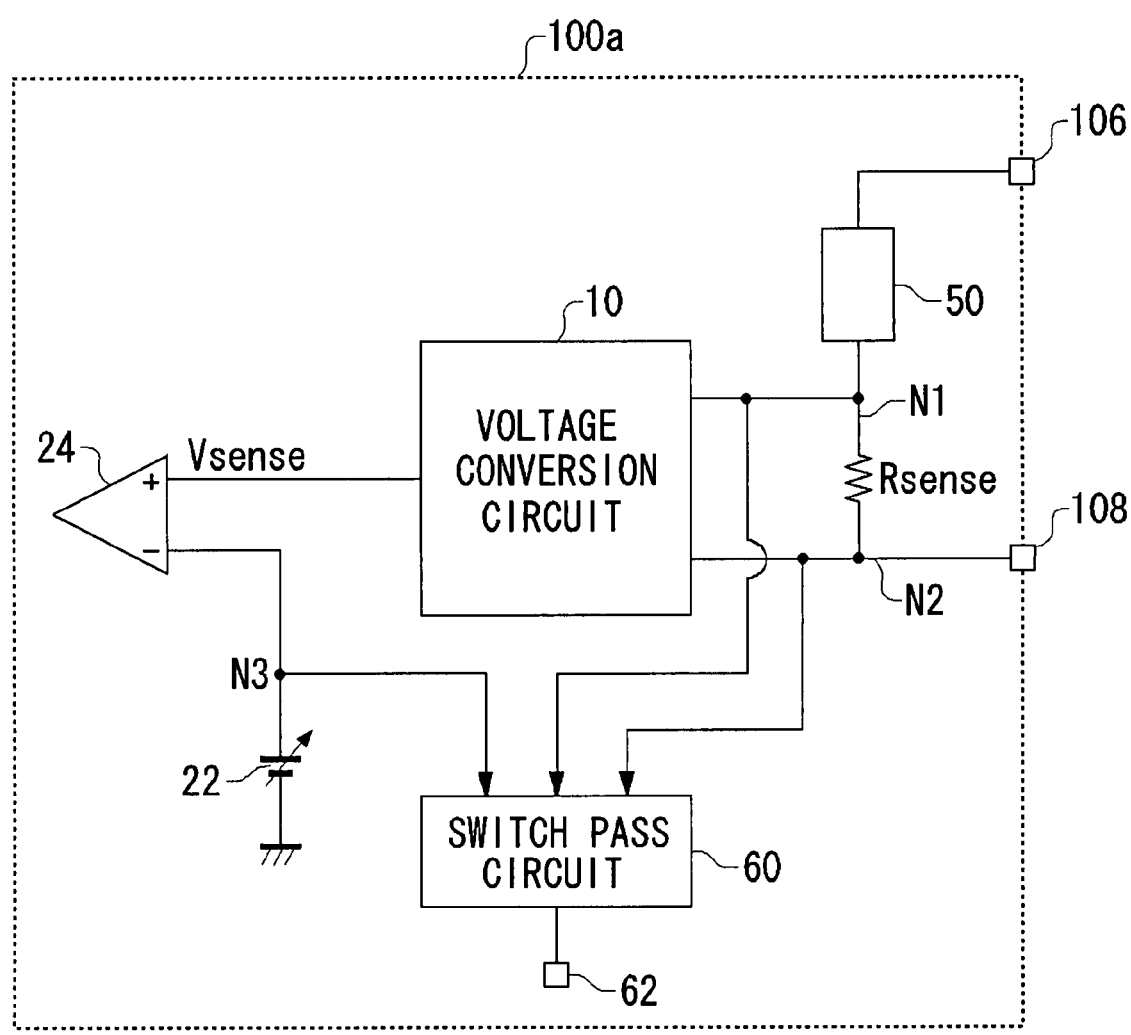
FIG. 5 is a circuit diagram showing a configuration of a charge control circuit according to a second embodiment of the present invention.

FIG. 5 is a circuit diagram showing a configuration of a charge control circuit 100a according to a second embodiment of the present invention. In the charge control circuit 100a shown in FIG. 5, the same components as those shown FIG. 1 are omitted.

In the charge control circuit 100 shown in FIG. 5, a circuit element 50 is provided in series with the sense resistor Rsense. This circuit element 50 is a switch element or the like for shutting off the charging path in a case when the charging operation for the battery 220 is stopped. In such a case, a structure is such that at least one terminal of the sense resistor Rsense is not directly connected to terminals 106 and 108 which are used for connection with an external circuit. More specifically, in FIG. 5 a high-potential-side terminal N1 of a first resistor R1 is not directly connected to a current input terminal 106. In the first embodiment, the both ends N1 and N2 of the sense resistor Rsense in the charge control circuit 100 are structured as pads through which to connect to an external circuit. In this regard, the second embodiment differs from the first embodiment. Such a difference in structure is also carried over into a case where the charging transistor Tr1 is integrated within the charge control circuit 100 as the circuit element 50.

In the charge control circuit 100a according to the second embodiment, in order to monitor the voltage at the both ends of the sense resistor Rsense the provision of a terminal for the terminal N1 of the sense resistor Rsense is required in addition to the current input terminal 106. However, since this terminal N1 is not in use during the charging operation, it will be wasteful in terms of circuit area if this terminal is provided as a pad. The same argument is applicable to the voltage monitoring terminal 110 for monitoring the reference voltage Vref of the variable voltage source 22 in FIG. 1.

In the second embodiment, there is provided a switch pass circuit 60 in order to minimize such wasteful pads. The switch pass circuit 60 includes a plurality of input terminals and a single output terminal 62. The switch pass circuit 60 selectively connects any one of the input terminals to the output terminal 62. The mechanism of selecting any one of the input terminals is so structured as to be controllable by a command from outside. Terminals to connect to the input terminals of the switch pass circuit 60 are those where the voltage to be monitored appears during an inspection process or those to which the voltage is to be applied from outside. In the actual charging operation, the terminals N1 and N3, which need not to be connected to the outside, connect to the input terminals of the switch pass circuit 60. In the second embodiment, the terminal N2 of the sense resistor Rsense connects also to the input terminal of the switch pass circuit 60. The output terminal 62 of the switch pass circuit 60 is formed as an electrode pad so that the voltage can be monitored from the outside the charge control circuit 100a or so that the voltage can be applied from the outside the charge control circuit 100a.

According to the charge control circuit 100a of the second embodiment, the voltages at a plurality of terminals are switched so as to be outputted from the output terminal 62. Therefore, it is no longer necessary to provide a pad for each terminal to be monitored. As a result, the circuit area can be reduced.

Third Embodiment

There are cases where in an inspection process it is desired that before or after the correction of the charging current Ichg described in the first and the second embodiment an inspection be carried out to see if the circuit operates normally or not. For example, this corresponds to a case where the error voltage Verr', which is an output of the second operational amplifier 24, changes normally if the sense voltage Vsense exceeds the reference voltage Vef.

As described above, the resistance value of the sense resistor Rsense is set to a very small value to reduce the power loss. Hence, in order that a sufficient voltage drop Vtest occurs across the sense resistor Rsense, it is required that the same large current as the actual charging current be delivered to the sense resistor Rsense. However, there may be cases where a tester used for the inspection process is incapable of supplying (or measuring) such a large current. In a third embodiment, provided is a technique by which to reduce the current delivered to the sense resistor Rsense.

Figure 6:
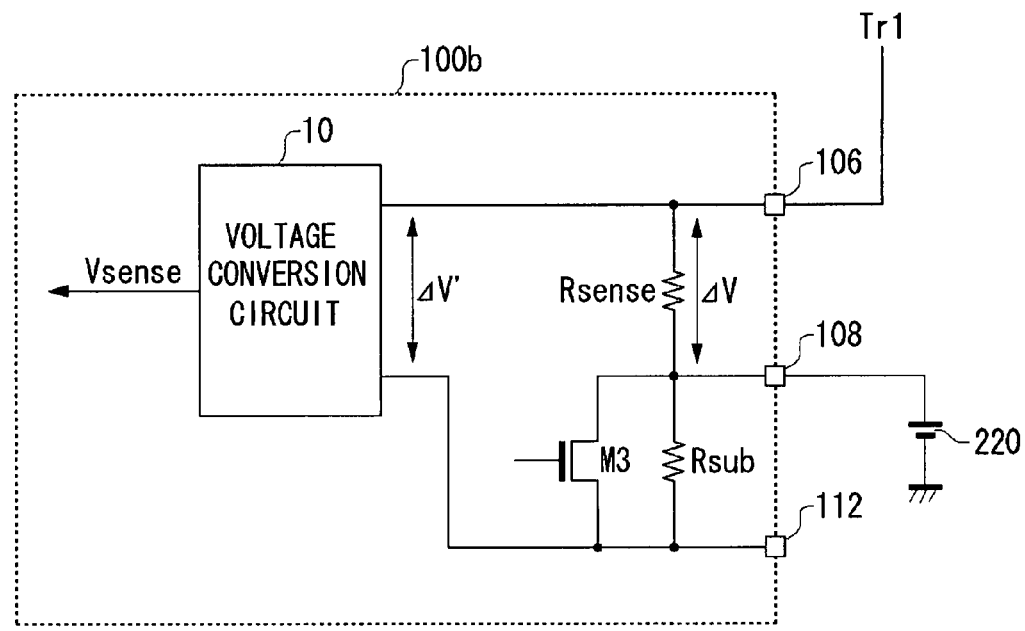
FIG. 6 is a circuit diagram showing a configuration of a charge control circuit according to a third embodiment of the present invention.

FIG. 6 is a circuit diagram showing a configuration of a charge control circuit 100b according to the third embodiment of the present invention. The charge control circuit 100b includes a subsidiary resistor Rsub and a bypass switch M3 in addition to the sense resistor Rsense and the voltage conversion circuit 10. The charge control circuit 100b further includes an auxiliary terminal 112 as a new terminal.

The auxiliary terminal 112 is so structured that voltage is applicable thereto from outside during an inspection process. In this third embodiment, too, the sense resistor Rsense is provided between the current input terminal 106, to which the charging current is inputted, and the battery terminal 108. The subsidiary resistor Rsub is provided between one end of the sense resistor Rsense and the auxiliary terminal 112. The resistance value of the subsidiary resistor Rsub is sufficiently large as compared with that of the sense resistor Rsense, and is set to several thousands to several ten thousands times the resistance value of the sense resistor Rsense. For example, when the resistance value of the sense resistor Rsense is $0.4\Omega$, it is desired that the subsidiary resistance Rsub be set to several $k\Omega$. The subsidiary resistor Rsub may be provided at a side of higher voltage than the sense resistor Rsense.

The bypass switch M3 which is a MOSFET, for example, is provided in parallel with the subsidiary resistor Rsub. The on-resistance of the bypass switch M3 is preferably about several tens of $\Omega$ so that the on-resistance thereof may be sufficiently smaller than the resistance value of the subsidiary resistance Rsub. The bypass switch M3 is set to "on" during a charging operation, and the bypass switch M3 bypasses the subsidiary resistor Rsub.

The voltage conversion circuit 10 converts a voltage occurring between the current input terminal 106 and the auxiliary terminal 112, namely a voltage $\Delta V'$ generated across the sense resistor Rsense and the subsidiary resistor, into a voltage Vsense with the ground voltage as a reference.

An operation of the charge control circuit 100b as structured above will now be described. First, a description is given of the operation thereof during a charging operation, followed by a description of the operation thereof during an inspection process separately. During a charging operation, the bypass switch M3 turns on. The charging current Ichg is delivered to the battery 220 via the current input terminal 106, the sense resistor Rsense and the battery terminal 108. Thus, similar to the first embodiment, a voltage drop given by $\Delta V = Rsense \times Ichg$ occurs across the sense resistor Rsense. Since the on-resistance of the bypass switch M3 is designed to be low, the voltage drop across the bypass switch M3 is very small compared with that across the sense resistor Rsense. Hence $\Delta V' \approx \Delta V$ holds, and the voltage almost equal to the voltage drop $\Delta V$ across the sense resistor Rsense can be converted into the sense voltage Vsense with the ground voltage as a reference.

Figure 7:
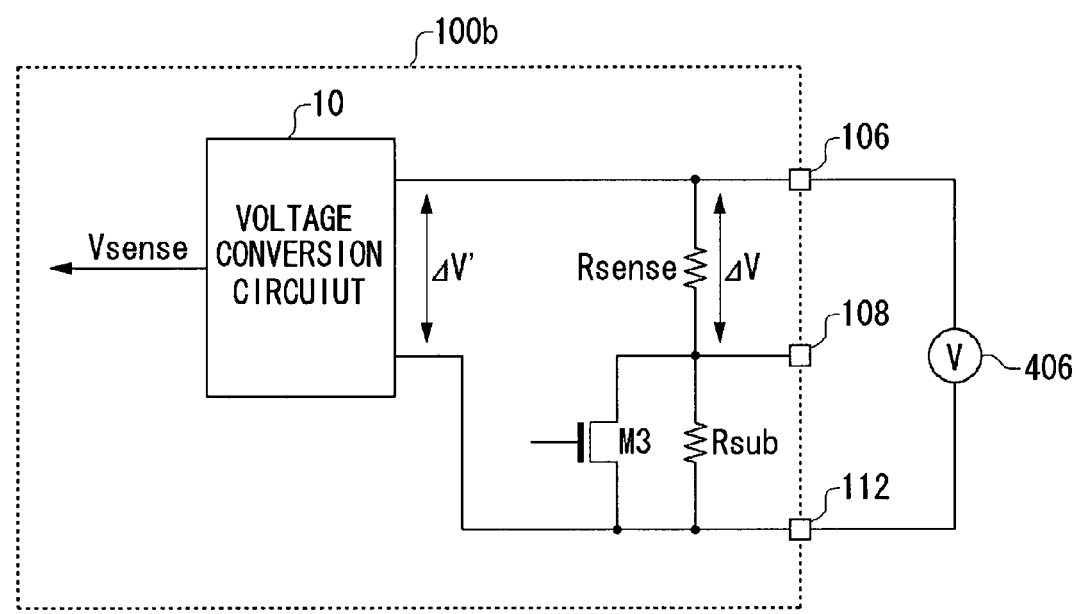
FIG. 7 is a circuit diagram showing an example of connection in a charge control circuit in an inspection process.

Now, an operation of the charge control circuit 100b during an inspection process is described. FIG. 7 is a circuit diagram showing an example of connection in the charge control circuit 100b in an inspection process. As an example, a description is given herein of a case where a voltage of 280 mV is applied to the voltage conversion circuit 10.

The bypass switch M3 is set to an off-state during the inspection process. If $\Delta V' = 280$ mV is applied to the voltage conversion circuit 10 as the input voltage, it is preferred that a voltage source 406 is connected between a current input terminal 106 and an auxiliary terminal 112 and a test voltage of Vtest=280 mV is applied there. At this time, the current flowing through the sense resistor Rsense will be 280 mV/$(0.4\Omega + 15 k\Omega) \approx 18.6 \mu A$. Such a minute current can be easily supplied from the voltage source 406, namely a tester.

On the other hand, if the similar test is performed on the charge control circuit 100 as shown in FIG. 1 and FIG. 3, all of 280 mV must be applied to the sense resistor Rsense and therefore a large current of 280 mV/$0.4\Omega = 700$ mA will flow through the sense resistor Rsense. Such a heavy current extremely narrows the options of testers used in the inspection process of the charge control circuit 100.

According to the charge control circuit 100b of the third embodiment, the subsidiary resistor Rsub is provided in series with the sense resistor Rsense, and in an inspection process the voltage is applied to both ends of a path including the sense resistor Rsense and the subsidiary resistor Rsub. As a result, it is possible to perform a test close to the actual operating state without the large current flowing through the sense resistor Rsense. During the actual charging, the charging current Ichg flows through a path including the current input terminal 106, the sense resistor Rsense and the battery terminal 108. Thus, the voltage drop across the subsidiary resistor Rsense and the bypass switch M3 can be ignored and the charging current Ichg can be adjusted based on the voltage drop across the sense resistor Rsense.

Note that the bypass switch M3 may be omitted in the third embodiment. In such a case, in a charging operation the voltage across the subsidiary resistor Rsub added with the voltage drop $\Delta V$ across the sense resistor Rsense is inputted to the voltage conversion circuit 10. If the input impedance of the voltage conversion circuit 10 is sufficiently high, almost no current will flow through the subsidiary resistor Rsub. Thus, the voltage drop across the subsidiary resistor Rsub can be ignored and $\Delta V' \approx \Delta V$ holds. As a result, the charging current Ichg can be controlled so that it is brought close to a target value even if the bypass switch M3 is omitted.

The switch pass circuit 60 may be provided in the charge control circuit 100b. In such a case, connecting the auxiliary terminal 112 with an input of the switch pass circuit 60 eliminates the need of provision of the auxiliary terminal 112 as an electrode pad, so that the increase in circuit area can be suppressed.

The above-described embodiments are merely exemplary, and it is understood by those skilled in the art that various modifications to the combination of each component and process thereof are possible and such modifications are also within the scope of the present invention.

In the above embodiments, a description was given of a case where the charging transistor Tr1, the charge control transistor Tr2 or the first resistor R1 is provided outside the charge control circuit 100 but the present invention is not limited thereto. Such components in part or whole may be integrated into the charge control circuit 100.

While the preferred embodiments of the present invention have been described using specific terms, such description is for illustrative purposes only, and it is to be understood that changes and variations may be further made without departing from the spirit or scope of the appended claims.

What is claimed is:

1. A charge control circuit for adjusting a charging current flowing through a battery to be charged from a power supply, the circuit comprising:
   a sense resistor provided on a charging path leading to the battery from the power supply;
   a charging current adjustment circuit which adjusts the charging current based on an error voltage between a voltage drop across said sense resistor and a predetermined reference voltage, wherein said sense resistor and said charging current adjusting circuit are integrated;
   a current input terminal which receives an input of the charging current;
   a battery terminal which outputs the charging current to the battery;
   a terminal for monitoring a voltage connected to an internal node at which the reference voltage appears, the reference voltage being measured by an external voltmeter through the voltage monitoring terminal in an inspection process, wherein
   said sense resistor, said charging current adjustment circuit, said current input terminal, said battery terminal, and said voltage monitoring terminal are monolithically integrated on a single semiconductor substrate, and
   wherein said charging current adjustment circuit comprises:
      a voltage conversion circuit which converts a voltage drop across said sense resistor into a voltage potential to ground voltage;
      a variable voltage source which generates the predetermined reference voltage;
      an error amplifier which generates an error voltage between the reference voltage and the voltage drop; and
      a current adjusting unit which adjusts an on-state of a charging transistor provided on the charging path, according to the error voltage outputted from the error amplifier,
      wherein said variable voltage source comprises an adjusting means which adjusts the reference voltage by a trimming process.

2. A charge control circuit for adjusting a charging current flowing through a battery to be charged from a power supply, the circuit comprising:

a sense resistor provided on a charging path leading to the battery from the power supply;

a charging current adjustment circuit which adjusts the charging current based on an error voltage between a voltage drop across said sense resistor and a predetermined reference voltage, wherein said sense resistor and said charging current adjusting circuit are integrated;

a current input terminal which receives an input of the charging current;

a battery terminal which outputs the charging current to the battery;

a switch pass circuit which comprises a plurality of input terminals and a single output terminal and which selectively connects any one of the input terminals to the output terminal, wherein a terminal, among terminals in said charge control circuit, to which a voltage is to be applied from outside in an inspection process and which does not need to be connected with outside at the time of an actual charging operation is connected with one of the plurality of input terminals.

3. A charge control circuit according to claim 1, further comprising:

an auxiliary terminal configured such that a voltage is capable of being applied thereto from outside in an inspection process; and a subsidiary resistor provided between said auxiliary terminal and one end of said sense resistor, wherein said charging current adjustment circuit adjusts the charging current based on voltage across said subsidiary resistor and the predetermined reference voltage.

4. A charge control circuit according to claim 3, further comprising a bypass switch, provided in parallel with said subsidiary resistor, which turns off during an inspection process and turns on during a charging operation.

5. A charging circuit for charging a battery based on supply voltage from a power supply, the circuit comprising:

a charging transistor provided on a path leading to the battery from the power supply; and a charge control circuit structured to adjust a charging current supplied to the battery by adjusting an on-state of said charging transistor, the charge control circuit comprising:

a sense resistor provided on a charging path leading to the battery from the power supply;

a charging current adjustment circuit which adjusts the charging current based on an error voltage between a voltage drop across said sense resistor and a predetermined reference voltage, wherein said sense resistor and said charging current adjusting circuit are integrated;

a current input terminal which receives an input of the charging current;

an battery terminal which outputs the charging current to the battery;

a terminal for monitoring a voltage connected to an internal node at which the reference voltage appears, the reference voltage being measured by an external voltmeter through the voltage monitoring terminal in an inspection process, wherein said sense resistor, said charging current adjustment circuit, said current input terminal, said battery terminal, and said voltage monitoring terminal are monolithically integrated on a single semiconductor substrate; and a terminal used to measure the reference voltage in the inspection process;

wherein said charging current adjustment circuit comprises:

a voltage conversion circuit which converts a voltage drop across said sense resistor into a voltage potential to ground voltage;

a variable voltage source which generates the predetermined reference voltage;

an error amplifier which generates an error voltage between the reference voltage and the voltage drop; and a current adjusting unit which adjusts an on-state of a charging transistor provided on the charging path, according to the error voltage outputted from the error amplifier, wherein said variable voltage source includes an adjusting means which adjusts the reference voltage by a trimming process.

6. A method for correcting a charging current of a charge control circuit having a structure including a sense resistor provided on a charging path leading to a battery from a power supply and a charging current adjustment circuit which adjusts the charging current based on an error voltage between a voltage drop across the sense resistor and a predetermined reference voltage, the method comprising:

measuring a resistance value of the sense resistor;

measuring the reference voltage;

calculating the charging current by dividing the measured reference voltage by the measured resistance value of the sense resistor;

calculating a difference current between the calculated charging current and a target value of the charging current;

calculating an amount of adjustment for the reference voltage by dividing the calculated difference current by the resistance value of the sense resistor; and adjusting the reference voltage by adding the calculated amount of adjustment for the reference voltage to the reference voltage or subtracting the calculated amount from the reference voltage.

* * * * *